Sept. 30, 1924.  
C. A. MILLER, SR  
AUTOMATIC BOTTLE UNLOADER  
Filed May 5, 1923  
1,510,097  
3 Sheets-Sheet 1

Inventor  
Charles Alvin Miller Sr.  
By Mason Fenwick Lawrence,  
Attorneys

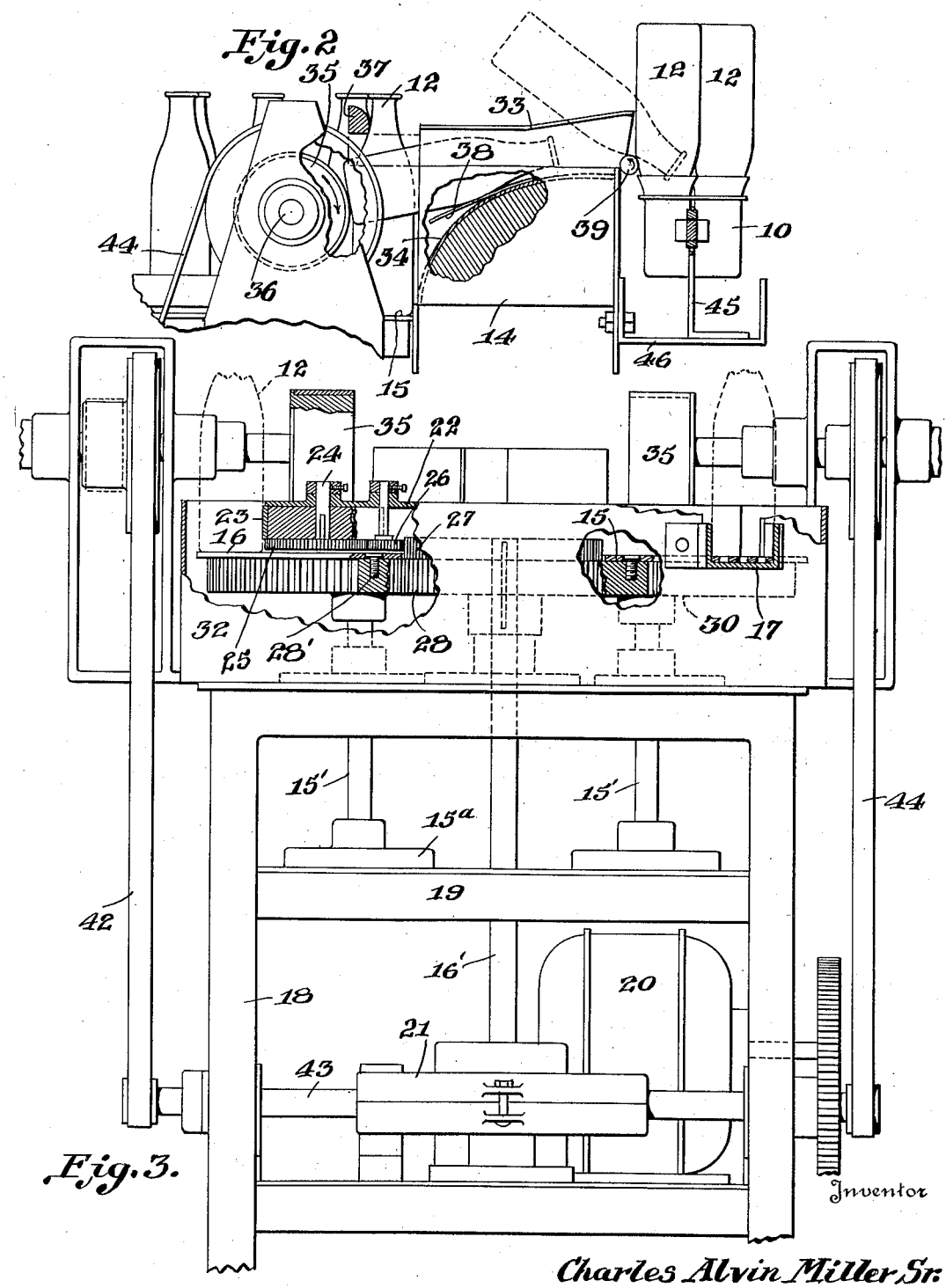

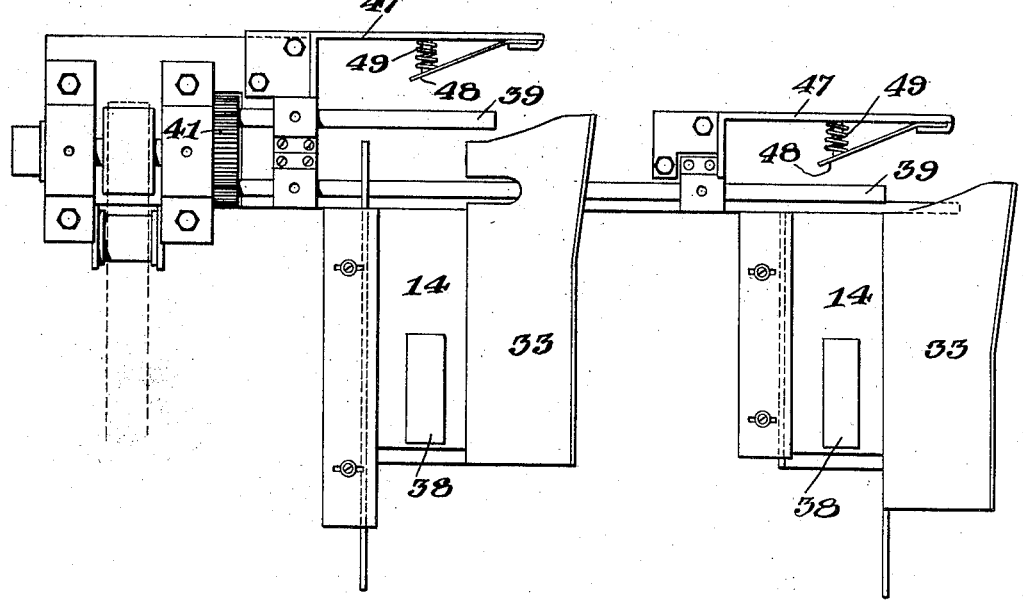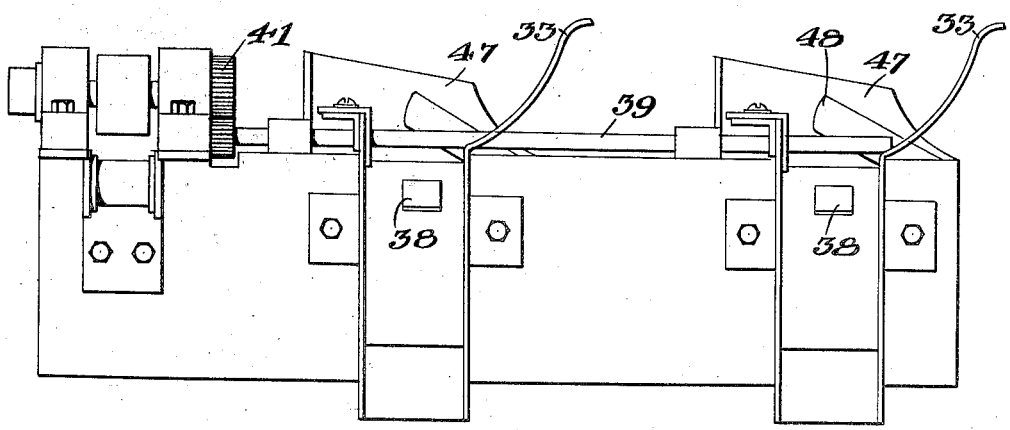

Patented Sept. 30, 1924.

1,510,097

UNITED STATES PATENT OFFICE.

CHARLES ALVIN MILLER, SR., OF BAINBRIDGE, GEORGIA, ASSIGNOR TO MILLER MANUFACTURING COMPANY, OF DECATUR COUNTY, GEORGIA, A CORPORATION OF GEORGIA.

AUTOMATIC BOTTLE UNLOADER.

Application filed May 5, 1923. Serial No. 636,893.

*To all whom it may concern:*

Be it known that I, CHARLES ALVIN. MILLER, Senior, a citizen of the United States, residing at Bainbridge, in the county of Decatur and State of Georgia, have invented certain new and useful Improvements in Automatic Bottle Unloaders; and I do hereby declare the following to be a full, clear, and exact description of the invention, such as will enable others skilled in the art to which it appertains to make and use the same.

In certain types of bottle washing machines, the bottles are supported in inverted position on an endless bottle carrier. It is an object of this invention to provide a mechanism for unloading the bottles from the endless carrier after they have been washed and place them on a suitable support in an upright position for being filled.

The various features of novelty and invention will appear from the detailed description taken in connection with the accompanying three (3) sheets of drawings forming part of this specification, the scope of the invention being defined in the appended claims.

Fig. 2 is a fragmentary side elevation of the machine.

Fig. 3 is a rear end elevation of the machine parts being shown in section.

Fig. 4 is a plan view of certain parts of the machine and Fig. 5 is a side elevation of Fig. 4.

Figure 1:
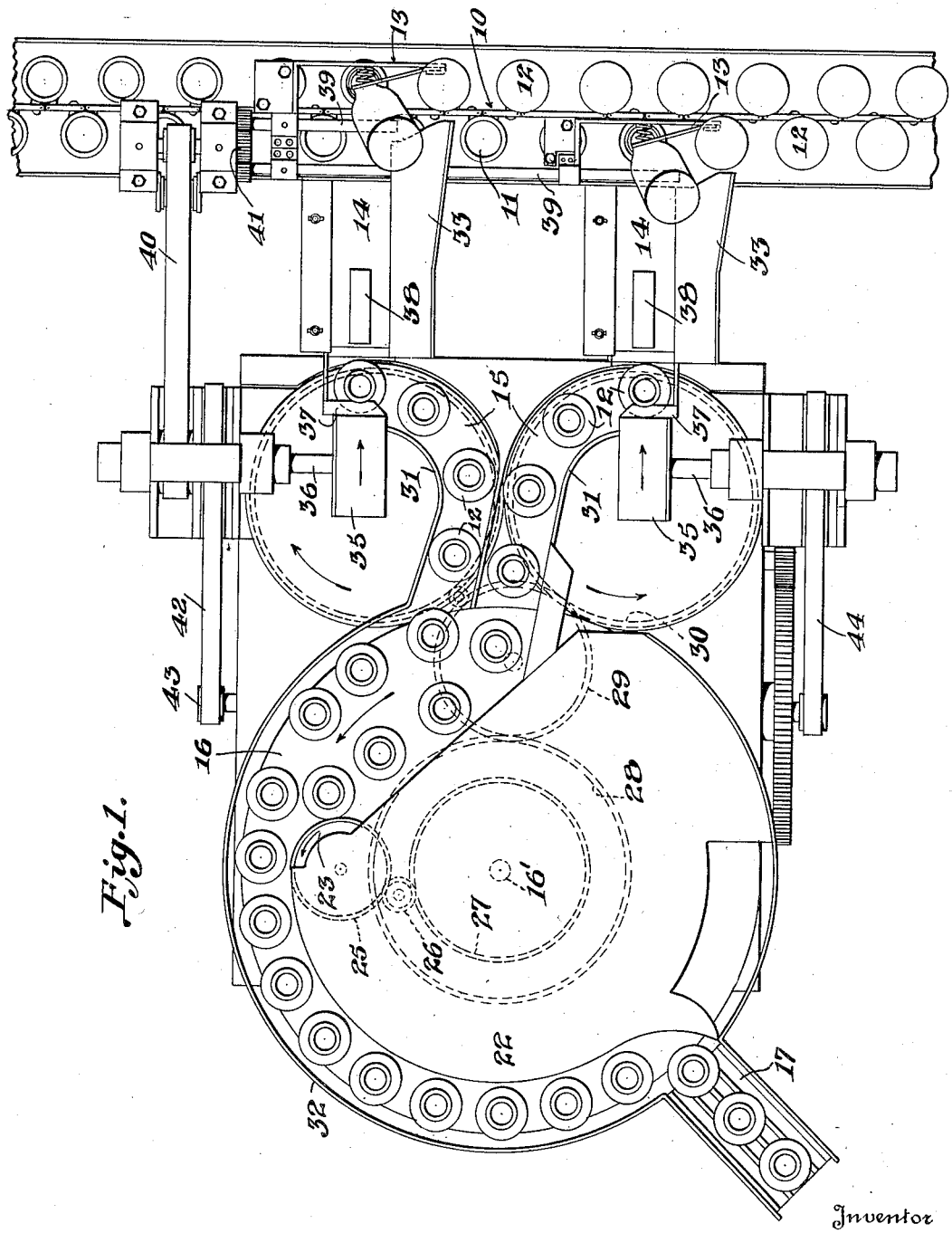
Fig. 1 is a diagrammatic plan view of the bottle unloading machine.

Referring to Fig. 1 there is shown an endless chain bottle carrier 10 having bottle receiving sockets or cups 11 in staggered relation on either side of the chain. Further detailed description of the chain is not necessary to this invention and reference is made to Patent No. 1,181,913, granted May 2, 1916 for a fuller disclosure of the same.

As already stated the bottles, generally indicated at 12, are carried along in inverted position on the carrier 10, the necks of the bottles being received in the cups or sockets 11. Associated with each row of bottle sockets is a device, generally indicated at 13, for bowling over the bottles. As the bottles are bowled over they are received on a transfer member 14, which has a drop down which the bottles slide bottom foremost. The bottles land on rotary tables 15 the same being turntables which discharge the bottles on to a turntable or platform 16 from whence they are discharged on to a traveling belt 17 for conveyance to a bottle filling machine. Suitable means are provided for imparting motion to the movable parts.

The frame of the machine may take any suitable form and is generally indicated at 18. The landing tables 15 are supported on vertical shafts 15' which are suitably stepped in the bearings 15ª supported on a cross member 19 of the frame 18. The large turntable 16 is supported on a shaft 16', the shaft being driven by a motor 20 through suitable gearing contained within the housing 21.

Disposed over the large turntable is a plate 22 of irregular outline. Supported from this plate is a disc 23, the same being mounted on a shaft 24 having a gear 25 at its lower end adapted to mesh with an idler 26 which latter is driven by gear 27 affixed on the shaft 16' below the disc or platform 16 proper. The function of the rotary disc 23 will be presently explained but it will be noted that its direction of rotation is the same as the underlying platform 16. The means for driving the landing tables 15 may conveniently take the form of a gear 28 affixed on the shaft 16' and an idler 29 meshing therewith and also meshing with a gear 30 affixed to a shaft of one of the platforms 15.

Associated with each table landing 15 is a bottle guide 31 for confining the bottles to a definite path for directing them toward the large platform 16 as the tables 15 are rotated. As the bottles are received on the large platform 16 they are carried toward the disc 23 and this disc will serve to position the bottles at the outer edge of the table 16. If the bottles should tend to become wedged at the entrance to the channel at the mouth of which the disc 23 is located the latter will tend to push the same into the channel. The disc 23 is preferably covered with leather or the like frictional material, so as to function more efficiently in starting the bottles in the channel if there should be any tendency of the bottles to bind or bunch at the entrance to the channel. The channel is defined by the arcuate form of the plate 22 between the disc 23 and the location of the endless belt 17 at a point removed from the disc 23. The platform 16 is bounded by a wall 32 which prevents the bottles from falling off the turntables 16.

The transfer 14 between the landing tables 15 and the endless chain bottle carrier 10 will now be described. After the bottles are bowled over by the mechanism 13, to be hereinafter more fully described, they fall on the transfer device 14, which is a trough-like member having an upwardly flaring side 33 down which the bottles may slide after being bowled over. There is a difference of level between the landing tables 15 and the upper edge of the cups 11 of the bottle carrier 10, and the transfer member 14 is, therefore, provided with a drop 34 for guiding the bottles to the platform 15.

In order to assist in positioning the bottles on their bases on the landing tables 15 there is provided a rotating disc 35, which is affixed at the end of a horizontally disposed shaft 36. The disc 35 is covered with suitable friction material such as leather, and is rotated in such a direction that when the bottles come in contact therewith they are pushed or carried down toward the landing table 15, as will be more fully understood by reference to Fig. 2. As the bottles slide down the drop 34 of the transfer 14 their bottoms may strike the disc 35 for a moment, consequently, the disc will impart a downward movement to the same. The disc 35 will also serve as a guide or abutment for preventing the toppling over of the bottles after they have landed on the platform 15. There may also be provided a guide 37 against which the necks of the bottles will strike after they have landed on the table. In order to cushion the bottles somewhat in their movement down the drop 34 there may be provided a spring-board like member 38, which is affixed at one end on the upper part of the incline. This member 38 will also serve to impart a pushing action to the bottles toward the disc 35 as the bottom of the bottles approach the table 15.

In order to more readily dislodge the bottles from their cups or sockets 11 of the endless carrier 10 there is provided at the head of each transfer member 14 and somewhat above the upper edge of the cups a shaft 39, which is designed to rotate in such a direction that when the bottles come in contact with the same they will be lifted out of their sockets or cups and fulcrum or slide over the shaft as they turn on the transfer 14. In view of the fact that there are two rows of bottles one of the shafts must be disposed over the carrier as will be readily understood, but the functioning of both shafts is exactly the same. The shafts are driven from a common belt 40 and suitable gearing 41 is provided between the shafts so as to impart the same directional rotation to both of them. One of the upper flaring walls 33 of the transfer 14 is a little longer than the other so as to have its terminal disposed adjacent the remote row of bottle cups 11, as will be readily understood from the drawings.

The belt 40 which drives the shafts 39 may be driven from a pulley affixed on the end of a shaft 36 which drives the disc 35 and the shaft 36 may be driven by a belt 42 which passes around the pulley on the end of a shaft 43, which is in suitable connection with the driving motor 20. A belt 44 passes around a pulley at the other end of the shaft 43 and drives the other disc 35. The various driving connections may take any suitable form without departing from the spirit of the invention and need not be described except in a general way.

The endless bottle carrier 10 is confined to a straight line movement and proper position in front of the transfer members 14 by means of an upright rail 45 suitably supported on a shelf or bracket 46, which latter is affixed to the frame-work of the machine in any suitable manner as to the transfer members.

The means for dislodging the bottles from the bottle carrier will now be described. Disposed over each row of cups or sockets 11 adjacent the outer edge of the same is a plow-like member 47 having a downwardly extending edge which forms the point of the plow, said edge being adapted to extend under the bottle at the bulge between the neck and the body of the bottle so that as the carrier moves along toward the plow the bottles will ride up on the inclined edge and thus be lifted from their cups. Attached to the point of the plow member is a presser plate 48 which is arranged at an angle to the line of travel of the endless carrier and this plate will contact with the bottles and push them over toward the adjacent transfer member 14, as will be readily understood. A coil spring 49 may be provided between the free end of the presser plate 48 and the body of the plow member 49 so as to allow a different tensioning of the presser plate whereby to adapt the device for bottles of different sizes.

The detailed manner in which the invention may be embodied in a machine is not deemed necessary to an understanding of the invention, and the showing in the present case is, therefore, more or less diagrammatic as regards the constructional features of the machine. With reference to Fig. 3, however, it may be stated that the turn table or platform 16 is shown as a plate affixed to the top face of the gear 28 by means of set-screws 28', and the gear 30 of one of the turntables 15 is also shown as having a plate secured thereto by means of a set-screw, such plate constituting the table 15.

While the invention has been described with considerable particularity of detail, it is to be distinctly understood that no limitations are intended except as may be imposed by the appended claims.

What I claim is:

1. In combination, a bottle drop down which bottles may slide bottom foremost, a rotary table on which the bottles are received from said drop, a rotary platform adjacent said table, means for guiding bottles from said table to said platform for placement on the outer edge of the same, and an endless conveyer leading from said platform onto which bottles are received from the platform.

2. In combination, a pair of bottle drops down which bottles may slide bottom foremost, a pair of rotary tables on which the bottles are received from said drops, a rotary platform adjacent said tables, bottle guiding means associated with each table forming a path through which bottles are discharged from the tables onto the platform, and means overlying the platform for positioning the bottles received thereon in a single row at the outer edge of the platform.

3. In combination, a pair of bottle drops down which bottles may slide bottom foremost, a bottle guide leading from each drop into a common receiving channel, oppositely rotating tables one below each of said guides on which the bottles are received from said drops, said tables moving the bottles along said guides into said common channel, a rotary platform below said channel on which the bottles are supported after leaving the said tables and from which they are eventually discharged, said channel having a restricted passage whereby the bottles received from said tables are brought into a single row at the outer edge of the platform before discharge from the platform.

4. The combination specified in claim 3, and a rotary device at the head of the restricted passage of said channel for positively bringing the bottles into line for passage through said passage.

5. The combination with a bottle carrier comprising a row of cups into which the necks of bottles may be received, of means for lifting the bottles from the cups comprising a rotary member past which the carrier moves, said member being disposed near the upper edge of the cups, and means for pushing the bottles over against the rotary member as the carrier moves past the same.

6. The combination of a carrier on which bottles are adapted to be supported in inverted position, means for bowling over the bottles as they pass a given point, means on which the bottles are received as they are bowled over said means having a drop, a turntable at the foot of the drop on which the bottles land bottom down, and means disposed over the turntable above the foot of the drop for positioning the bottles on the turntable.

7. In combination, a device on which bottles may be received in toppled-over condition, said device having a drop down which the bottles pass bottom foremost, a movable member at the foot of the drop on which the bottles land, and a rotary member above the said movable member against which the bottles strike as they come down the drop said rotary member directing the bottles toward the movable member.

8. In combination, a carrier on which bottles may be supported in inverted position, means for bowling over the bottles carried thereon comprising an inclined lifter disposed over the carrier in the line of travel of the bottles and up which the bottles tend to ride, and a presser finger arranged transversely across the path of travel of the bottles for bowling the bottles over as they are lifted up.

9. The combination with a bottle carrier comprising a row of cups into which the necks of bottles may be received, a lifter disposed at an upwardly directed angle in the line of travel of the carrier over the cups at one side of the axis thereof, said lifter tending to elevate the bottles from their cups, and a shaft disposed on the other side of the axis of said cup and against which the bottles fall when toppled over by the lifter, said shaft being rotatable in a direction tending to further lift the bottles out of their cups.

In testimony whereof I affix my signature.

CHARLES ALVIN MILLER, Sr.